(12) United States Patent
Zellmer et al.

(10) Patent No.: US 8,604,743 B2
(45) Date of Patent: Dec. 10, 2013

(54) METHOD FOR OPERATING AN ELECTRIC WINDOW LIFT OF A CONVERTIBLE

(75) Inventors: René Zellmer, Shanghai (CN); Roland Kalb, Rossach (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 363 days.

(21) Appl. No.: 13/177,828

(22) Filed: Jul. 7, 2011

(65) Prior Publication Data
US 2012/0005963 A1    Jan. 12, 2012

(30) Foreign Application Priority Data
Jul. 7, 2010  (DE) .......................... 10 2010 026 366

(51) Int. Cl.
*E05F 15/16*   (2006.01)
*G05B 9/02*    (2006.01)

(52) U.S. Cl.
USPC ............................. 318/626; 318/561; 318/434

(58) Field of Classification Search
USPC ......... 318/280, 283, 286, 434, 466–469, 561, 318/626
See application file for complete search history.

(56) References Cited

U.S. PATENT DOCUMENTS

| | | | |
|---|---|---|---|
| 5,625,980 A * | 5/1997 | Teich et al. ........................ 49/26 |
| 6,499,359 B1 * | 12/2002 | Washeleski et al. ..... 73/862.473 |
| 8,448,521 B2 * | 5/2013 | Washeleski et al. ............ 73/780 |
| 2007/0133958 A1 | 6/2007 | Held |
| 2007/0194732 A1 | 8/2007 | Heyn |
| 2008/0297076 A1 | 12/2008 | Sakai et al. |

FOREIGN PATENT DOCUMENTS

| | | |
|---|---|---|
| DE | 20 2005 019 464 U1 | 5/2007 |
| EP | 1 826 352 A1 | 8/2007 |
| JP | 10-331524 | 12/1998 |

* cited by examiner

*Primary Examiner* — Bentsu Ro
(74) *Attorney, Agent, or Firm* — Muncy, Geissler, Olds & Lowe, PLLC

(57) ABSTRACT

An especially failsafe method for operating an electric window lift for closing and opening a window of a convertible is provided. A threshold value that is relevant to the triggering of an anti-pinch protection system of the window lift is regularly adapted to the actuation-position-dependent behavior of a sensed operating quantity of the window lift, at least in a lower region of the actuation path of the window, both when the top of the convertible is closed and when it is open. At least for the first window closing process after a closing of the top, the threshold value is rigidly predefined in an upper region of the actuation path of the window.

7 Claims, 2 Drawing Sheets

METHOD FOR OPERATING AN ELECTRIC WINDOW LIFT OF A CONVERTIBLE

This nonprovisional application claims priority under 35 U.S.C. §119(a) to German Patent Application No. 10 2010 026 366.4, which was filed in Germany on Jul. 7, 2010, and which is herein incorporated by reference.

BACKGROUND OF THE INVENTION

1. Field of the Invention

The invention relates to a method for operating an electric window lift for closing a side window of a vehicle, for example, a convertible vehicle. The invention further relates to a device for carrying out the method of operation.

2. Description of the Background Art

An electric window lift is used for automatically opening and closing a side window of a vehicle. Closing the window causes it to move in a known manner from a lower initial position, in which the window is open, to an upper final position, in which the window is closed. The path that the window travels in this process can be hereinafter referred to as the actuation path. The instantaneous position of the window along its actuation path can be referred to as the actuation position.

Electric window lifts are generally equipped with what is called anti-pinch protection, i.e., with a function of the window lift control by means of which the window is reversed, or at least stopped, when it encounters an obstacle during the closing process. Such anti-pinch protection serves to ensure that no object, and especially no body part, is pinched between a top edge of the window and a window frame—or a vehicle roof in the case of frameless windows—during automatic closing of the window.

The speed of an associated window lift motor is often monitored to detect a pinch event. The speed or another operating quantity derived therefrom is continuously compared with a stored threshold value. In this scheme, a pinch event is inferred when the speed drops below the threshold value or when the threshold value corresponding to the other operating quantity is exceeded in a positive or negative direction—depending on the definition of the operating quantity.

However, variations in the speed arise not only in a pinch event, but also in normal operation of a window lift, predominantly influenced by the varying running resistance of the window over the actuation path. In particular, a significant drop in the speed regularly occurs in this process at the upper end of the actuation path, when the upper edge of the window enters the top window seal shortly before the final position is reached. In order to reliably avoid false triggering upon such a "system-related" drop in speed, i.e. an erroneous detection of a pinch event that is not actually present, frequently the threshold value is not specified as a constant, but instead as a function of the actuation position.

However, since the system-related fluctuation in the speed also varies with time, for example as a result of the changing outside temperature or aging of the window seal, the actuation-position-dependent function of the threshold value often is not rigidly predefined. Rather, in this case the actuation-position-dependent threshold value is continuously adjusted by the window lift controller. This adjustment is typically referred to as adaptation. Here, the window lift controller "learns" where a recurring sluggishness is present and raises or lowers the threshold value in this region of the actuation path accordingly.

Such adaptation is problematic with convertibles, since the top window seal is only present when the top is closed and not when it is open. A threshold adaptation that had taken place with the top closed would thus disadvantageously be "unlearned" again when the top is open. This can have the result that the entry of the window into the roof seal once the top is closed again is erroneously detected as a pinch event, and the window is accordingly "mis-reversed."

In conventional window lifts for convertibles, this problem is often solved by the means that the adaptation is completely switched off when the top is open. Disadvantageously, this can have the result that ongoing relearning of the adaptation occasionally does not take place over long periods of time. This can lead to a variety of malfunctions of the window lift, especially when the top is closed after the vehicle has been parked for long periods with the top open.

SUMMARY OF THE INVENTION

It is therefore an object of the invention to provide a method for operating an electric window lift of a convertible that ensures especially failsafe anti-pinch protection. The invention has the additional object of specifying a device suitable for carrying out the method.

In an embodiment, provision is made that a trigger threshold for the anti-pinch protection of the window lift that is predefined as a function of the actuation position of the window is regularly adapted, at least in a lower region of the actuation path of the window, with both closed and open top, usefully at every closing of the window. In so doing, at the first window closing after a closing of the top, the adapted behavior of the threshold value is replaced by a stored, standard threshold value in an upper region of the actuation path, and preferably only in an upper region of the actuation path.

The threshold value can be a reference value of an operating quantity of the window lift measured within the framework of anti-pinch protection; when this value is exceeded either positively or negatively, the anti-pinch protection system detects a pinch event. In the simplest case, the speed of the actuating motor is measured as the operating quantity. In this case, a pinch event is detected when the measured speed falls below the threshold value. However, any measured quantity that permits a conclusion to be drawn regarding the actuating speed of the window or a change therein may be used as the operating quantity.

In order to ensure ongoing, variable adaptation of the threshold value, provision is preferably made within the scope of the operating method for the operating quantity that is to be compared to the threshold value, for example the speed, to be recorded and stored at each closing operation of the window, so that the behavior of the operating quantity as a function of the actuation position is known—for example, for multiple window closing processes that have been performed. In this design, the actuation-position-dependent behavior of the threshold is altered on the basis of the recorded behavior of the operating quantity in such a manner that an erroneous triggering of the anti-pinch protection resulting from the system-related fluctuation of the operating value is reliably avoided.

In an embodiment of the adaptation process, the behavior of the operating quantity measured during the preceding closing process, plus or minus a predefined tolerance range, can be used as the threshold behavior in each case. In a more numerically stable embodiment of the method, provision is made in a variation therefrom for the threshold value for each actuating position to be derived from a moving average of the values of the operating quantity measured at the same actuation position during a number of previous closing processes. In the latter variant of the method, the threshold value is successively adapted to new environmental conditions in small steps over a number of closing processes.

An "upper region" of the actuation path can be defined essentially as the region of the actuation path in which the top edge of the window enters the top seal or a seal groove thereof. To distinguish it from the foregoing, the "lower region" of the actuation path can designate the region of the actuation path in which the top edge of the window does not engage the seal.

By means of the ongoing adaptation of the threshold value, even when the top is open, relatively long gaps in adaptation are avoided, so that the adaptation of the threshold value can always be kept current, at least in the lower region of the actuation path. At the same time, malfunctions following the closing of the top are prevented by rigidly predefining the threshold in the upper region of the actuation path at least for the first closing process of the window after the top is closed.

In an embodiment, the threshold value in the upper region of the actuation path can be defined (by means of the stored standard threshold value) only for the first window closing process after the closing of the top. Starting with the second window closing process after the closing of the top (if and as long as the top is still closed), the threshold value can also be adapted again in the upper region of the actuation path.

In an embodiment, the standard threshold value in the upper region of the actuation path can be an actuation-position-independent constant. However, an actuation-position-dependent standard threshold profile can also be stored. In an alternative variant of the method, the threshold value in the upper region of the actuation path can be reset after the reclosing of the top to the last behavior that was established here before the immediately preceding opening of the top. In other words, for the first window closing process after the closing of the top, the last profile "learned" with the top closed is remembered and reused after the top is closed again.

When the top is open, the threshold value can be adapted over the entire actuation path.

The control unit can be configured to automatically operate an electric window lift for a (side) window of a convertible in accordance with the above-described operating method in one of the variants described.

In an embodiment, the control unit can be a microprocessor in which control software for carrying out the method is implemented. In this case, the control unit can be configured by software for carrying out the method in that the control unit automatically carries out the method in its intended operation. However, the control unit can alternatively also be configured by circuitry for carrying out the inventive method, in other words it can contain a non-programmable electronic circuit that carries out the inventive method in its intended operation. In this variant, the control unit can be implemented in the form of what is called an ASIC.

Further, the control unit can incorporate, as functional components of its control software, an anti-pinch protection module and a threshold value transmitter, wherein the latter can be configured to generate the threshold value according to the above-described method and provide it to the anti-pinch protection module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding components and quantities are labeled with the same reference symbols in all figures.

Figure 1:
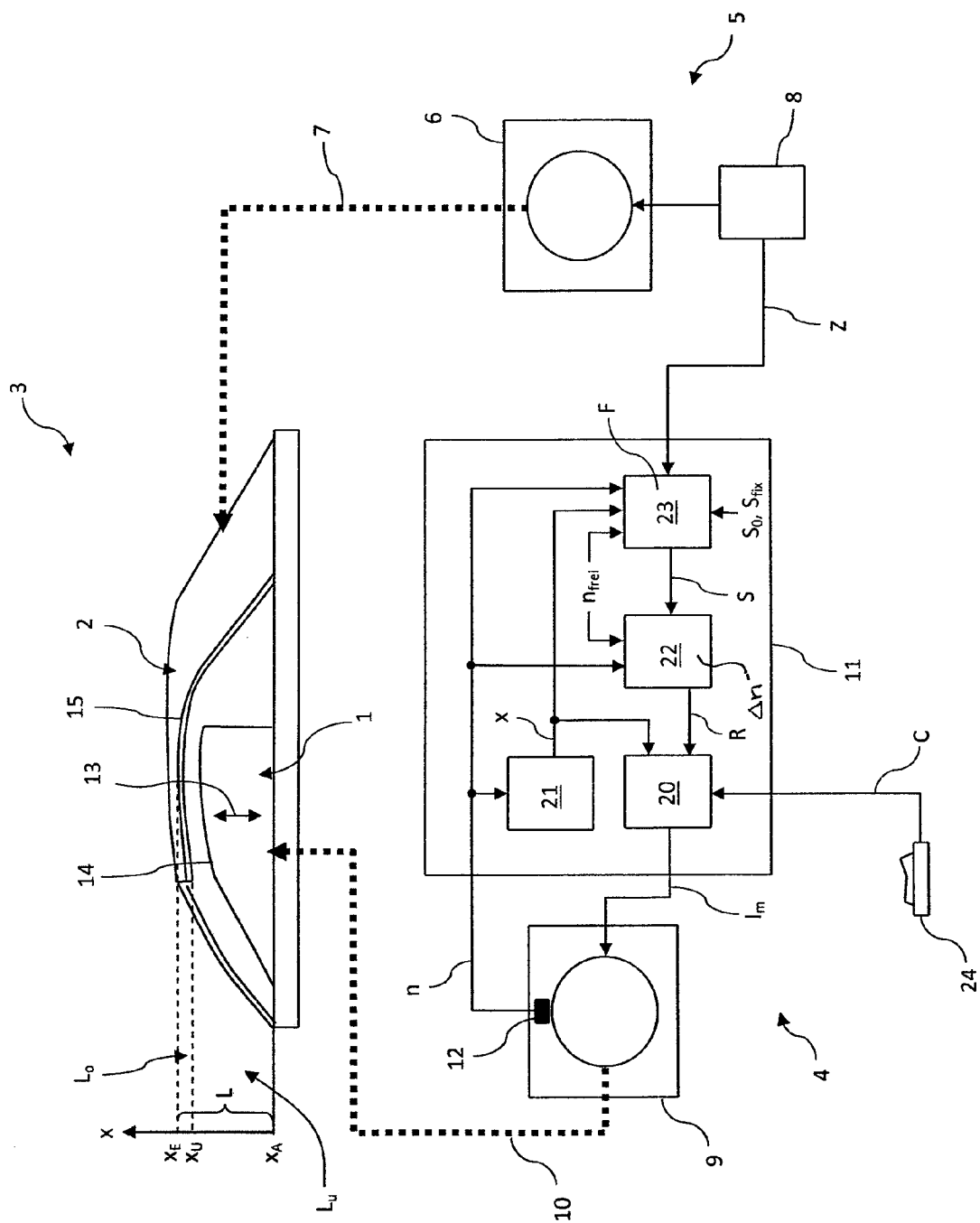
FIG. 1 is a schematic representation of a control unit for a window lift for electrically opening and closing a side window of a convertible.

FIG. 1 shows a schematic side view of a partially opened (side) window 1 and a closed top 2 of a convertible 3—which is only roughly indicated in sections. Sketched schematically in the bottom half of the drawing are a window lift 4 for automatically opening and closing the window 1 and an actuator 5 for automatically opening and closing the top 2.

The actuator 5 includes an electric motor 6, which acts on the top 2 through an actuating mechanism 7. The actuator 5 also includes a control unit 8 operating the motor 6.

The window lift 4 includes another electric motor 9, which acts on the window 1 through an actuating mechanism 10. The window lift 4 also includes a control unit 11 operating the motor 9. The window lift 4 also includes a speed sensor 12 associated with the motor 9, which determines the speed n of the motor 9 during operation of the window lift 4 and outputs said speed to the control unit 11 as a measure of the actuation speed of the window 1. The speed sensor 12 is preferably a Hall sensor, which works together with a ring magnet placed on the motor shaft of the motor 9.

By means of the window lift 4 the window 1 is displaced in an essentially vertical linear motion that is indicated by an arrow 13. During a closing process of the window 1, its top edge 14 traverses an actuation path L. From a fully open state, corresponding to an initial position $x_A$, the edge 14 first passes through a lower region of the actuation path $L_u$. The lower region of the actuation path $L_u$ is delimited at the top by a transition position $x_U$, but one where the edge 14 nearly contacts a seal 15 mounted on the top 2. After passing through the transition position $x_U$, the edge 14 of the window 1 passes through an upper actuation region $L_o$, in which the edge 14 enters a groove of the seal 15, until the edge 14 of the window 1 arrives at a final position $x_E$ in which the window 1 is fully closed.

The control unit 11 includes, in particular, a switching module 20, an actuation position determination module 21, an anti-pinch protection module 22, and a threshold value transmitter 23.

The switching module 20 serves to directly switch the motor 9, i.e. to switch on, switch off, and reverse the motor current $I_m$ supplied to the motor 9. The switching module 20 is in turn operated by, among other things, switching signals C from a power window switch 24 that can be actuated by a vehicle occupant.

The actuation position determination module 21 is configured to ascertain the current actuation position x of the window 1 along its actuation path L through integration over the speed n supplied by the speed sensor 12.

The anti-pinch protection module 22 is configured to detect a pinch event, in which the closing motion of the window 1 is impeded or even blocked by an obstacle located in the actuation path L, by analyzing the speed n supplied by the speed sensor 12.

To this end, the anti-pinch protection module 22 continuously generates a speed difference $\Delta n$ between a no-load speed $n_{frei}$ stored as a constant in a memory of the control unit 11 and the speed n sensed by the speed sensor 12:

$$\Delta n = n_{frei} - n \qquad \text{Eq. 1}$$

The no-load speed $n_{frei}$ here represents the steady-state final speed that the motor 9 typically achieves on average during the no-load phase of a closing process. The speed difference $\Delta n$ thus predominantly has a value of approximately zero in the no-load phase of the closing process, and takes on larger values as the measured speed n drops relative to the no-load speed $n_{frei}$.

The anti-pinch protection module 22 continuously compares the sensed speed difference $\Delta n$ to a threshold value S. In doing so, the anti-pinch protection module 30 always infers the presence of a pinch event when the speed difference $\Delta n$ exceeds the threshold value S during a closing process of the window 1:

$$\Delta n > S \qquad \text{Eq. 2}$$

As soon as this trigger condition is fulfilled, the anti-pinch protection module 22 outputs a reversing signal R to the switching module 20, on the basis of which the switching module 20 reverses the window motion through appropriate operation of the motor 9. The closing motion of the window 1 is thus stopped upon detection of the pinch event, and the window 1 is reopened by a predefined actuation path interval. The threshold value S is in turn provided to the anti-pinch protection module 22 by the threshold value transmitter 23.

In normal operation of the window lift 4, the threshold value transmitter 23 determines the threshold value S as a function of the S of the actuation position x, $$S = S(x), \qquad \text{Eq. 3}$$

by the means that it adapts the threshold value S to the actuation-position-dependent behavior of the speed $n=n(x)$ of a majority N of preceding closing processes in an iterative learning process. Specifically, the threshold value transmitter 23 stores the actuation-position-dependent behavior of the speed $n=n(x)$ for each of the predefined number N of successive past closing processes, and then determines the setpoint S for each actuation position x by a moving average of the speed values $n_i(x)$ that were sensed at the same actuation position x in the course of each of the preceding closing processes:

$$S(x) = S_0 + \Delta n_{sys}(x) \text{ with} \qquad \text{Eq. 4}$$

$$\Delta n_{sys}(x) = n_{frei} - \frac{1}{N} \cdot \sum_{i=1}^{N} n_i(x) \qquad \text{Eq. 5}$$

In the nomenclature of Eq. 5, i=1 represents the count index for the last, i.e. immediately preceding, closing process, i=2 represents the count index for the second-to-last closing process, etc. In a preferred embodiment of the method the speed values $n_i(x)$ of three preceding closing processes are taken into account in the averaging (i.e. N=3).

The quantity $S_0$ in Eq. 4 represents a so-called base threshold value. The quantity $\Delta n_{sys}$ is referred to below as a regularly recurring or system-related speed difference.

The threshold value transmitter 23 always ascertains the threshold value S independently of the top position, which is to say both when the top 2 is open and when the top 2 is closed, using Eq. 4 and 5. The only exception is immediately after the closing of the top 2, when the threshold value transmitter 23 ascertains the threshold value S in a different manner in that it consistently sets the threshold value S for actuation positions x in the upper region of the actuation path $L_o$ to a predefined, increased value $S_0 + S_{fix}$:

$$S(x) = \begin{cases} S_0 + \Delta n_{sys}(x) & \text{for } x_A \leq x < x_u \\ S_0 + S_{fix} & \text{for } x_U \leq x \leq x_E \end{cases} \qquad \text{Eq. 6}$$

Figure 2:
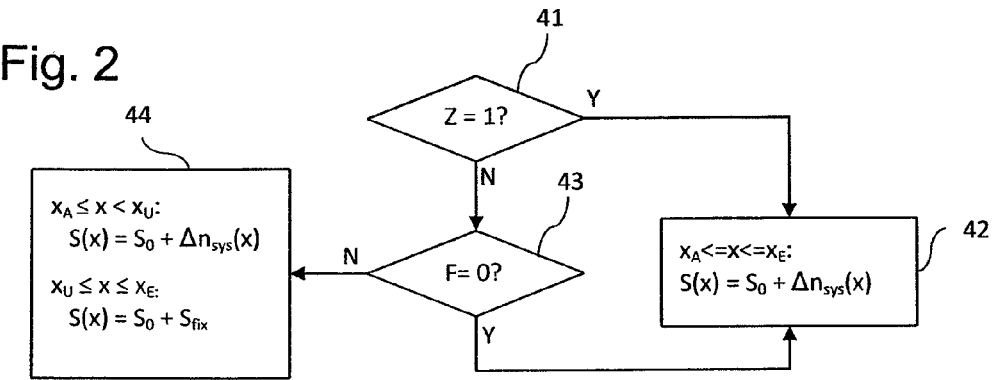
FIG. 2 is a flow diagram of an operating method automatically carried out by the control unit.

In concrete terms, in doing so the threshold value transmitter 23 is automatically carrying out the method shown schematically in FIG. 2, in which it first asks in an initial query 41 whether the top 2 is open. For this purpose, it is using a top status signal Z, which is supplied to it by the control unit 8. The top status signal Z has a value Z=1 when the top 2 is open, and a value Z=0 when the top 2 is closed, for example.

When the top 2 proves to be open (path Y in query 41), the threshold value transmitter 23 uses Eq. 4 and 5 to adapt the threshold value S in step 42 independently of the range, which is to say for the entire actuation path L.

Otherwise (path N in query 41), the threshold value transmitter 23 checks in an additional query 43 whether a closing process of the window 1 has already been carried out after the closing of the top 2. In this process, the threshold value transmitter 23 accesses an internal status flag F, which it sets to the value F=1, for example, as soon as it detects that the top 2 has been closed based on the status change from Z=1 to Z=0 in the top status signal Z, and that it resets back to the value F=0 the first time the window 1 is closed after the closing of the top 2.

If the threshold value transmitter 23 ascertains in this check that the window 2 has already been closed at least once following the closing of the top 2 (branch Y in query 43), it jumps to step 42 and consequently adapts the threshold value S over the entire actuation path L according to Eq. 4 and 5.

Otherwise (branch N in query 43), the threshold value transmitter 23 adapts the threshold value S using Eq. 6 (step 44).

In a preferred embodiment, the control unit 11 is composed essentially of a microcontroller in which the actuation position determination module 21, the anti-pinch protection module 22, and the threshold value transmitter 23 are implemented as functional components of control software. The switching module 20 may of course also be implemented through software. In a useful embodiment, however, the switching module 20 includes electronic or electromechanical switching elements for switching and reversing the motor current $I_m$.

Figure 3:
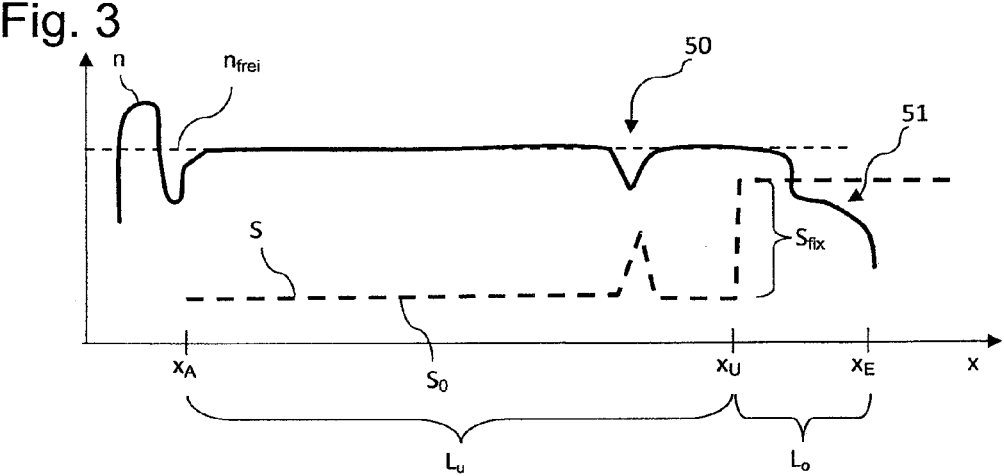
FIG. 3 is a simplified schematic diagram of the behavior of the speed of a window lift motor as a function of an actuation position of the side window, and the corresponding behavior of a threshold value compared, to detect a pinch event, with a speed difference during the first closing process of the side window after the top is closed.
Figure 4:
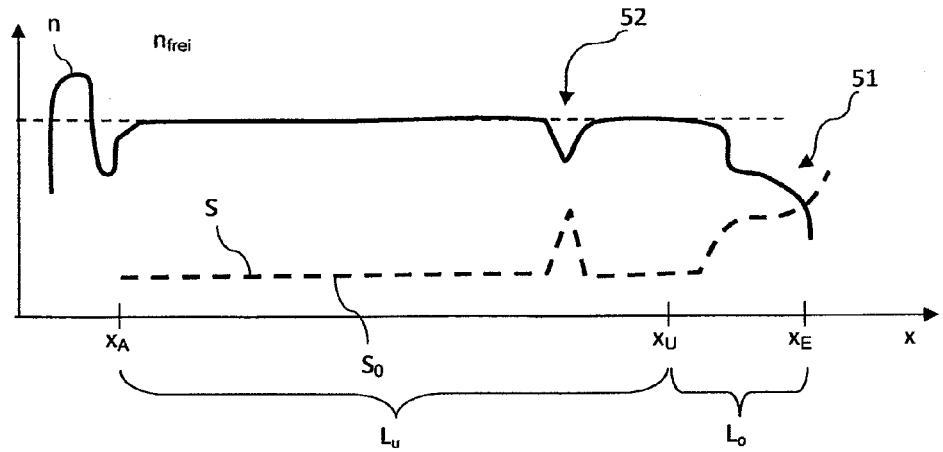
FIG. 4 illustrates in a diagram in accordance with FIG. 3, respective behaviors of the speed and the threshold during the second closing process of the side window after the top is closed.

The typical behavior of the speed n during a closing process of the window 1 with the top 2 closed is shown in FIGS. 3 and 4, in each case graphed with respect to the actuation position x. Also included in each of these graphs is the actuation-position-dependent behavior of the threshold S. FIG. 3 shows the behavior of the threshold S during the first closing process of the window 1 after the closing of the top 2. FIG. 4 shows the behavior of the threshold S during the second closing process of the window 1 when the top 2 continues to remain closed.

It is evident from FIGS. 3 and 4 that the speed n corresponds essentially to the no-load speed $n_{frei}$ over the majority of the lower region of the actuation path $L_u$. In contrast, a local, but clearly evident, speed drop 50 takes place in the upper third of the lower region of the actuation path $L_u$, which is caused by, for example, a weather-related deformation of a side window seal. In order to prevent the window 1 from being erroneously reversed during each closing process on account of this sluggishness, in this region the threshold value S is increased with respect to the base threshold value $S_0$ by an appropriate absolute amount so that the anti-pinch protection module 22 does not respond until an even larger speed drop occurs. The speed drop 50 occurs regardless of the position of the top 2.

An additional speed drop 51 in the upper region of the actuation path $L_o$ is caused by the window 1 entering the seal 15. By its nature, this speed drop 51 only occurs when the top 2 is closed. Since the threshold value S has not yet been adapted to the changed speed behavior immediately after the closing of the top 2, the speed drop 51 could bring about an incorrect reversing of the window 1 with the threshold behavior unmodified. This risk of error is reliably eliminated in that the threshold value S is increased by the offset $S_{fix}$ at the first closing of the window 1 after the closing of the top 2 in the upper region of the actuation path $L_o$ in accordance with Eq. 6 (FIG. 3). It is evident from FIG. 4 that the behavior of the threshold S during the course of the subsequent closing processes of the window 1 is adjusted successively to the actual behavior of the speed n.

The variations in speed evident on the left side at the start of the closing process are caused primarily by the clearance in the window lift mechanism, and consequently are not taken into account by the threshold value transmitter 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an electric window lift for closing and opening a window of a vehicle, the method comprising:
    adapting a threshold value, which is relevant to a triggering of an anti-pinch protection of the window lift, to an actuation-position-dependent behavior of a sensed operating quantity of the window lift, at least in a lower region of the actuation path of the window both when a top of the vehicle is closed and when it is open, and
    rigidly predefining the threshold value in an upper region of the actuation path of the window at least for a first window closing process after a closing of the top.

2. The method according to claim 1, wherein starting with a second window closing process after a closing of the top, the threshold value is adapted to an actuation-position-dependent behavior of a sensed operating quantity as a function of the actuation position in the upper region of the actuation path.

3. The method according to claim 1, wherein the threshold value for the first window closing process after a closing of the top in the upper region of the actuation path is predefined with an absolute amount exceeding a base threshold value.

4. The method according to claim 1, wherein the threshold value for the first window closing process after a closing of the top is adapted in the upper region of the actuation path to a standard threshold profile stored as a function of actuation position.

5. The method according to claim 4, wherein the threshold value for the first window closing process after a closing of the top is adapted in the upper region of the actuation path to the behavior that the threshold value exhibited in this region of the actuation path prior to the preceding opening of the top.

6. A control unit configured to operate an electric window lift provided for opening and closing a window of a convertible according to claim 1.

7. The method according to claim 1, wherein the vehicle is a convertible.

* * * * *